US012720432B2

(12) United States Patent
Soman et al.

(10) Patent No.: US 12,720,432 B2
(45) **Date of Patent: *Aug. 25, 2026**

(54) SENSOR AIDED BEAM MANAGEMENT

(71) Applicant: QUALCOMM Incorporated, San Diego, CA (US)

(72) Inventors: Mehul Soman, San Jose, CA (US); Rashmi Kulkarni, Redwood City, CA (US); Justin McGloin, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,031

(22) Filed: Jan. 29, 2024

(65) Prior Publication Data

US 2024/0172114 A1 May 23, 2024

Related U.S. Application Data

(63) Continuation of application No. 17/320,775, filed on May 14, 2021, now Pat. No. 11,910,314.

(51) Int. Cl.

*H04W 52/02* (2009.01)
*H04B 7/06* (2006.01)
*H04W 64/00* (2009.01)

(52) U.S. Cl.

CPC .... *H04W 52/0225* (2013.01); *H04B 7/06952* (2023.05); *H04W 64/00* (2013.01)

(58) Field of Classification Search

CPC . H04W 72/23; H04W 76/28; H04W 52/0216; H04W 72/0446; H04W 76/27;

(Continued)

(56) References Cited

U.S. PATENT DOCUMENTS 7,129,890 B1 10/2006 Redi et al.
9,369,960 B2 * 6/2016 Lee ...................... H04W 76/28

(Continued)

FOREIGN PATENT DOCUMENTS

CN 108616330 A 10/2018
JP 2015073307 A 4/2015

(Continued)

OTHER PUBLICATIONS

Taiwan Search Report—TW111110919—TIPO—Aug. 6, 2025.
International Search Report and Written Opinion—PCT/US2022/071265—ISA/EPO—Jun. 24, 2022.

*Primary Examiner* — Joseph Arevalo
(74) *Attorney, Agent, or Firm* — QUALCOMM Incorporated

(57) ABSTRACT

System and method for determining positional and activity information of a mobile device in synchronization with the wake-up period of the mobile device to perform antenna beam management and adjusting the wake-up period based on the positional and activity information of the mobile device. A mobile device comprises: a memory; at least one sensor for detecting data: a processor communicatively coupled to the memory, the processor is configured to: synchronize the at least one sensor with a wake-up period of the mobile device; receive the data detected by the at least one sensor; determine positional information based on the received data; determine activity information based on the received data; estimate a forward position of the mobile device based on the positional information and the activity information; and perform a management of antenna beams of the mobile device based on the positional information, the activity information and the forward position.

24 Claims, 6 Drawing Sheets

(58) Field of Classification Search
CPC ....... H04W 28/20; H04W 28/22; H04W 4/70; H04W 52/0229; H04W 8/24; H04W 80/02; H04W 80/10; H04W 52/0219; H04W 52/0225; H04W 52/0254; H04W 64/00; H04W 72/044; H04W 24/08; H04W 28/0278; H04W 72/0453; H04W 72/1273; H04W 72/21; H04W 74/0833; H04W 28/0289; H04W 28/06; H04W 28/12; H04W 52/0235; H04W 52/028; H04W 72/115
USPC ......................... 370/311, 350, 252, 318, 329
See application file for complete search history.

(56) References Cited

U.S. PATENT DOCUMENTS 9,473,582 B1 10/2016 Fraccaroli
10,219,315 B2 * 2/2019 Cesares Cano ....... H04W 76/28
2002/0051434 A1 5/2002 Ozluturk et al.
2005/0046584 A1 3/2005 Breed
2005/0179586 A1 8/2005 Klinnert et al.
2012/0190380 A1 7/2012 Dupray et al.
2013/0107802 A1 5/2013 Lee et al.
2014/0210646 A1 7/2014 Subramanya
2014/0334449 A1 11/2014 Rubin et al.
2014/0375496 A1 12/2014 Alpert et al.
2015/0095402 A1 4/2015 Fraccaroli
2015/0326463 A1 11/2015 Solondz
2015/0365938 A1 12/2015 Paulraj et al.
2016/0029403 A1 1/2016 Roy et al.
2016/0029404 A1 1/2016 Aryafar et al.
2016/0081139 A1 3/2016 Akhavan-Saraf et al.
2016/0205667 A1 7/2016 Shen et al.
2016/0254930 A1 9/2016 Hui et al.
2016/0295439 A1 * 10/2016 Yang ..................... H04W 24/10
2017/0033899 A1 2/2017 Rakib et al.
2017/0339641 A1 11/2017 Nigam et al.
2018/0062717 A1 3/2018 Mok et al.
2018/0176847 A1 * 6/2018 Fasil Abdul .......... H04W 76/10
2018/0191422 A1 7/2018 Xia et al.
2018/0213413 A1 7/2018 Roy et al.
2019/0058522 A1 2/2019 Haley et al.
2019/0199419 A1 6/2019 Teslenko et al.
2019/0215729 A1 * 7/2019 Oyman ............... H04L 65/1016
2019/0215800 A1 * 7/2019 Fujishiro ............. H04W 68/005
2019/0254013 A1 * 8/2019 Chang ....................... H04L 5/00
2020/0092846 A1 3/2020 Deng et al.
2020/0097075 A1 3/2020 Tokubo
2020/0229002 A1 * 7/2020 Kaikkonen ......... H04W 56/001
2020/0274590 A1 8/2020 Martin et al.
2020/0343619 A1 10/2020 Burdick et al.
2021/0068193 A1 * 3/2021 Kong ................ H04W 52/0264
2021/0099832 A1 4/2021 Duan et al.
2021/0250902 A1 8/2021 Lee et al.
2021/0345120 A1 11/2021 Montalvo
2021/0385710 A1 * 12/2021 Jin ........................ H04W 36/08
2022/0021469 A1 1/2022 Veijalainen et al.
2022/0039009 A1 2/2022 Iyer et al.
2022/0053594 A1 * 2/2022 Goel ..................... H04W 76/28
2022/0053597 A1 * 2/2022 Zhang ................... H04L 5/0048
2022/0086760 A1 * 3/2022 Agarwal ............... H04L 1/1819
2022/0191787 A1 * 6/2022 Shahid .............. H04W 52/0212
2022/0369226 A1 11/2022 Soman et al.
2022/0386330 A1 * 12/2022 Wu ..................... H04W 72/569
2023/0073015 A1 * 3/2023 Khan ................ H04W 52/0212
2023/0189291 A1 * 6/2023 Jiang ..................... H04L 1/1896
370/329
2025/0016876 A1 * 1/2025 Kim ...................... H04W 76/28

FOREIGN PATENT DOCUMENTS

JP 2017076958 A 4/2017
TW 201904214 A 1/2019
WO 2015028283 A1 3/2015
WO 2018075151 4/2018
WO 2019114963 A1 6/2019
WO WO-2020008911 A1 1/2020

* cited by examiner

SENSOR AIDED BEAM MANAGEMENT

CROSS-REFERENCE TO RELATED APPLICATION

This application is a continuation of U.S. patent application Ser. No. 17/320,775, filed May 14, 2021, entitled "SENSOR AIDED BEAM MANAGEMENT", which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

In wireless communication networks such as LTE (Long Term Evolution) network, antennae are used to transmit and receive signals between devices such as base stations and UEs (user equipment). In sub-6 Hz and mmWave systems of LTE, a UE needs to react quickly to changing conditions (such as UE movement and rotation) through beam switches by quickly orienting the directional beam of the antennae towards other devices such as base stations. The beam switches are used in both Connected Mode Discontinuous Reception (CDRX) and non-CDRX modes of LTE. However, the performance of beam switches is limited by the antenna resolution in tracking the UE's orientation, and in the CDRX mode, the modem of the UE may need to wake up frequently to accurately keep track of the UE's orientation to tune the antenna gain to increase performance. Such increase in the wake-up frequency of the modem may result in increased power consumption of the UE. In non-CDRX mode, the modem of the UE samples received signals at a faster rate to maintain performance at the expense of increased power consumption, but such increased signal sampling may not improve the detection of the right beam during the beam switching that occurs during the rotation or movement of the UE.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A method of managing antenna beams in a mobile device, the method comprising: synchronizing at least one sensor with a wake-up period of the mobile device; receiving data detected by the at least one sensor; determining positional information based on the received data; determining activity information based on the received data; estimating a forward position of the mobile device based on the positional information and the activity information; and performing a management of the antenna beams based on the positional information, the activity information and the forward position.

In an aspect, a mobile device comprises: a memory; at least one sensor for detecting data: a processor communicatively coupled to the memory, the processor configured to: synchronize the at least one sensor with a wake-up period of the mobile device; receive the data detected by the at least one sensor; determine positional information based on the received data; determine activity information based on the received data; estimate a forward position of the mobile device based on the positional information and the activity information; and perform a management of antenna beams of the mobile device based on the positional information, the activity information and the forward position.

In an aspect, a mobile device comprises: means for synchronizing at least one sensor with a wake-up period of the mobile device; means for receiving data detected by the at least one sensor; means for determining positional information based on the received data; means for determining activity information based on the received data; means for estimating a forward position of the mobile device based on the positional information and the activity information; and means for performing a management of antenna beams of the mobile device based on the positional information, the activity information and the forward position.

In an aspect, a non-transitory computer-readable storage medium comprising code, which, when executed by a processor, causes the processor to manage antenna beams in a mobile device, the non-transitory computer-readable storage medium comprising: code for synchronizing at least one sensor with a wake-up period of the mobile device; code for receiving data detected by the at least one sensor; code for determining positional information based on the received data; code for determining activity information based on the received data; code for estimating a forward position of the mobile device based on the positional information and the activity information; and code for performing a management of the antenna beams of the mobile device based on the positional information, the activity information and the forward position.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of thereof.

DETAILED DESCRIPTION

Figure 1:
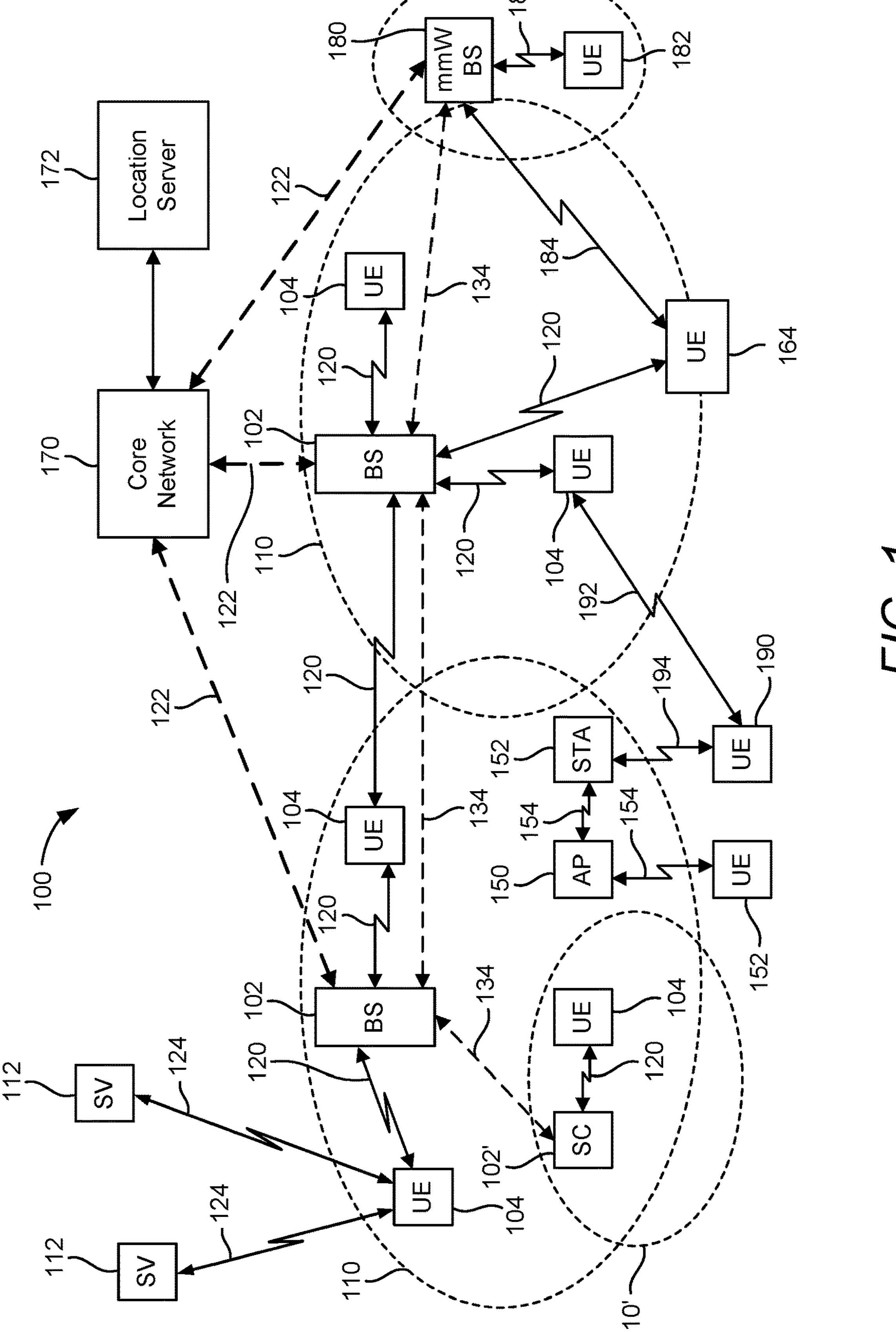
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally).

With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2:
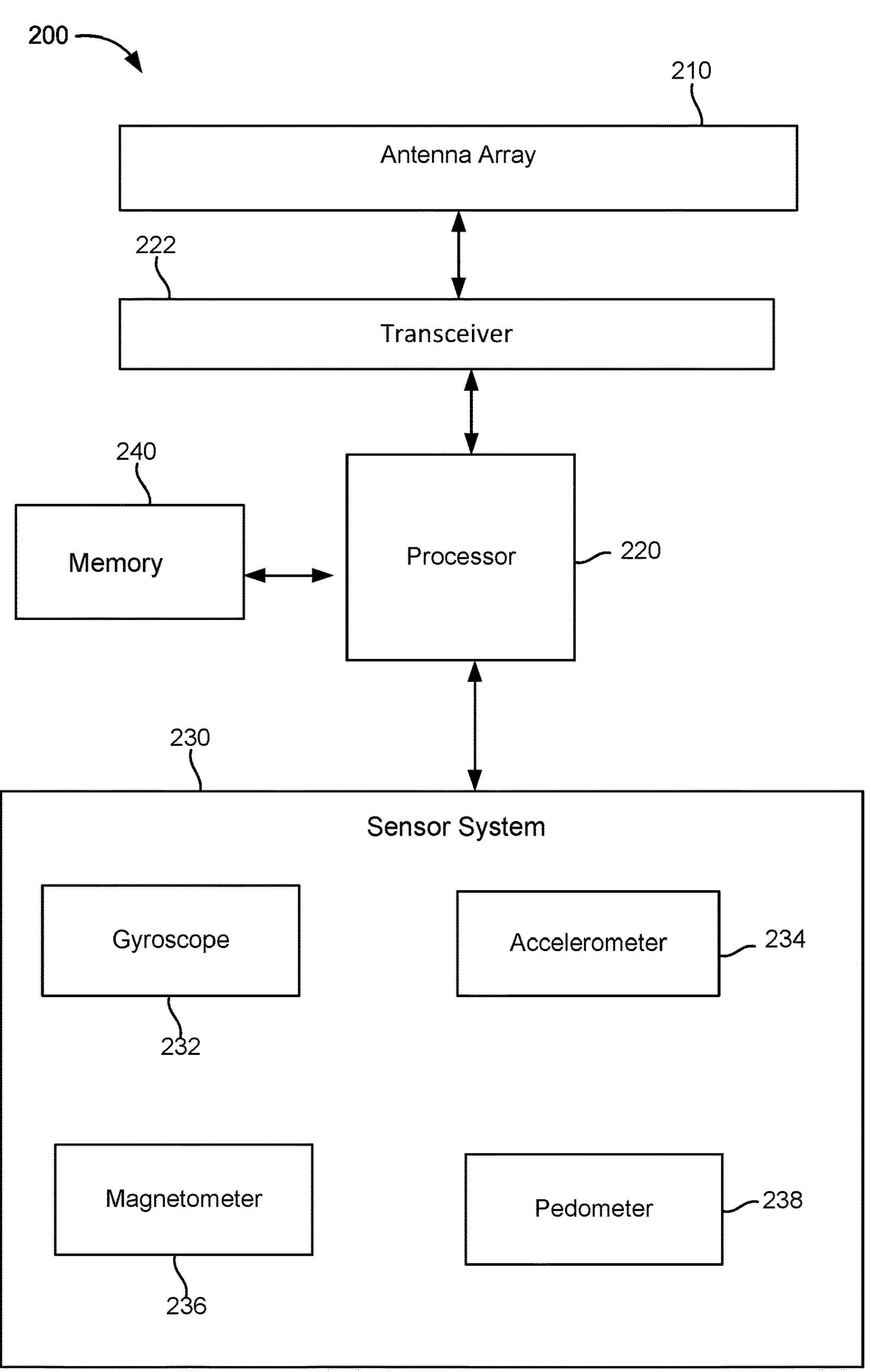
FIG. 2 illustrates an exemplary mobile device, according to aspects of the disclosure.

With reference to FIG. 2, a simplified schematic of an exemplary mobile device 200 with processor 220, antenna array 210, transceiver 222 and sensor system 230 for determining positional and activity information of mobile device 200 to manage antenna beams of mobile device 200 during CDRX and non-CDRX modes is illustrated. The wake-up periods of mobile device 200 may be adjusted based on the positional and activity information to improve the performance of the antenna beam management. Mobile device 200 further comprises memory 240. It will be noted that mobile device 200 may be similar to UE 104, 190 or any other UEs shown in FIG. 1 and may further comprise one or more components as known to one skilled in the art, but which are not illustrated in FIG. 2.

Mobile device 200 may be any suitable electronic device that is mobile. For example, mobile device 200 may be a smartphone, a tablet, a laptop, a smartwatch, a shipment tracking device, or the like.

Antenna array 210 includes multiple antennas for transmit and receive beamforming as explained above. Antenna array 210 is coupled to transceiver 222. Processor 220 may control antenna array 210 and transceiver 222. Transceiver 222 may include a wireless wide area network (WWAN) transceiver providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceiver may be connected to one or more antennas in the antenna array 210 for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). Transceiver 220 may further include a wireless local area network (WLAN) transceiver. The WLAN transceiver may be connected to one or more antennas in antenna array 210 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest.

In addition, transceiver 222 may include satellite positioning systems (SPS) receivers. The SPS receivers may be connected to one or more antennas in antenna array 210, respectively, and may provide means for receiving and/or measuring SPS signals, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers may comprise any suitable hardware and/or software for receiving and processing SPS signals.

Transceiver circuitry in transceiver 222 including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas such as antenna array 210, that permits the respective apparatus to perform transmit "beamforming," as described herein. Similarly, a receiver may include or be coupled to a plurality of antennas such as antenna array 210, that permits the respective apparatus to perform receive beamforming, as described herein. In an aspect, the transmitter and receiver may share the same plurality of antennas (e.g., antenna array 210), such that the respective apparatus can only receive or transmit at a given time, not both at the same time.

As shown in FIG. 2, processor 220 is coupled to transceiver 222. Processor 220 may control transceiver 222 and antenna array 210 to perform an antenna beam management. In an aspect, processor 220 may perform the antenna beam management at every wake-up period of mobile device 200. For example, if processor 220 performs an antenna beam management at every 10 ms, then the wake-up period for mobile device 200 is 10 ms. Processor 220 is also coupled to memory 240 and sensor system 230 as shown in FIG. 2. Sensor system 230 includes sensors such as gyroscope 232, accelerometer 234, magnetometer 236, pedometer 236 and any other type of movement detection sensors. Each of the sensors in sensor system 230 detects and measures its respective environment and transmits the measurement as a data to processor 220. In an aspect, processor 220 may control the operation of sensor system 230.

In an aspect, processor 220 may control the sensors in sensor system 230 and receive data from gyroscope 232, accelerometer 234, magnetometer 236 and pedometer 236. Gyroscope 232, accelerometer 234, magnetometer 236 and pedometer 236 may provide its respective data to processor 220 as directed by processor 220. In other words, processor 220 may direct gyroscope 232, accelerometer 234, magnetometer 236 and pedometer 236 when to send its respective data and thus control the timing of the data received from gyroscope 232, accelerometer 234, magnetometer 236 and pedometer 236.

Processor 220 may use the data received from the sensors (i.e., gyroscope 232, accelerometer 234, magnetometer 236 and pedometer 236) to determine positional information of mobile device 200 including at least one of the orientation, translation or motion of mobile device 200. The positional information may include the angles and movements of mobile device 200 in multiple axes as processed by processor 220 based on the data detected by the sensors. Moreover, the processor 220 may combine the outputs from the sensors in order to determine the activity information of mobile device 200. The activity information may include activities that the user of mobile device 200 have engaged in while possessing mobile device 200. For example, if the user of mobile device 200 is walking with mobile device 200, the activity information determined by processor 220 may include "walking". If the user of mobile device 200 is running with mobile device 200, the activity information determined by processor 220 may include "running". In an aspect, processor 220 may determine the activity information based on the data received from sensor system 230 during a period of time.

Processor 220 may use such algorithms as rotation vector algorithm, game rotation vector algorithm or Activity Recognition (AR) algorithm to determine the positional and activity information of mobile device 200. Such algorithms may be stored in memory 240 and processed by processor 220. For example, the processor 220 may use a combination of data from the sensors to compute positions of mobile device 200 in 2D and/or 3D coordinate systems. Processor 220 may use the AR algorithm to determine the activity information of mobile device 200 such as walking, biking, running, riding a vehicle or sitting, etc.

In an aspect, if mobile device 200 is operating under the CDRX mode, processor 220 may synchronize sensor system 230 with the CDRX mode period so that processor 220 may accurately determine the positional and activity information of mobile device 200 at the start and the end of each CDRX mode period. Thus, under the CDRX mode, processor 220 may align the wake-up period for antenna beam management with the CDRX mode cycle period. In other words, at the beginning of every CDRX mode cycle period, processor 220 may perform the antenna beam management by collecting data from the sensors in sensor system 230 and processing the collected data as explained below.

Figure 5:
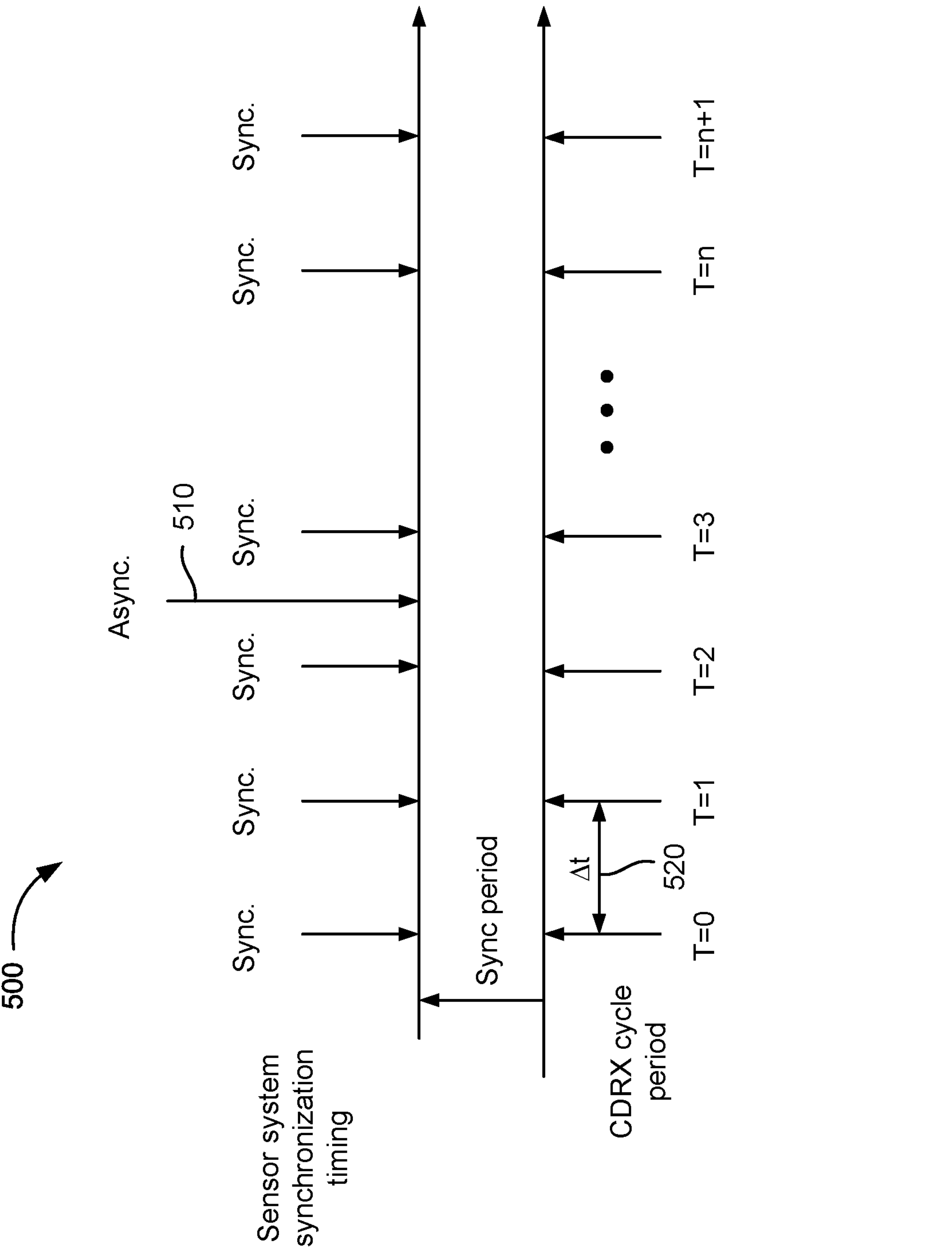
FIG. 5 is a timing diagram of an example CDRX period, according to aspects of the disclosure.

A timing diagram showing the synchronization during a CDRX mode is illustrated in FIG. 5. At time T=0 in FIG. 5, a CDRX cycle period starts and mobile device 200 wakes-up from sleep (i.e., low power state). At T=0, the sensors in sensor system 230 may transmit the data detected by the sensors (i.e., gyroscope 232, accelerometer 234, magnetometer 236 and pedometer 236) to processor 220. Basically, processor 220 may synchronize sensor system 230 to transmit the data detected by the sensors with the CDRX cycle period. FIG. 5 shows the timing of the synchronization of sensor system 230 with the CDRX cycle period by using downward arrows labeled as "Sync.". Then, processor 220 may process the data and perform the antenna beam management based on the data. Thus, when mobile device 200 wakes-up again at T=1, sensor system 230 transmits new data detected by the sensors at T=1 to processor 220 since a new CDRX cycle period starts at T=1. Then, processor 220 may process the new data and perform the antenna beam management based on the new data. This happens at T=2, T=3, and so on as shown in FIG. 5. In an aspect, under the CDRX mode, the wake-up period for antenna beam management aligns with the CDRX mode cycle period.

After receiving the data from the sensors but before the start of next CDRX cycle period, processor 220 may use the data received from the sensors to determine and generate the positional and activity information of mobile device 200. Processor 220 may use various algorithms as mentioned above (such as rotational vector algorithm or AR algorithm) to generate the positional and activity information of mobile device 200. Processor 220 may then use the positional and activity information to perform antenna beam management such as transmit and receive beamforming using the antennas in antenna array 210. For example, processor 220 may use rotational vector generated from the data detected by the sensors to perform transmit and receive beamforming using the antennas in antenna array 210.

In addition, processor 220 may use the data from the sensors to forward predict or estimate the positional information of mobile device 200 such as orientation and motion of mobile device 200 in the future. For example, by using the data collected from the sensors in sensor system 230 at T=0, processor 220 may forward predict or estimate the positional information of mobile device 200 at time T=1. In other words, processor 220 estimates the orientation, the motion or the position of mobile device 200 in the future based on the current data collected from the sensors in sensor system 230. In an aspect, the forward prediction or estimate may be made for the next CDRX cycle period. Processor 220 may forward predict by using various prediction filters that are selected based on the user activity as determined by the AR algorithm or the data from pedometer 236.

For example, if processor 220 determines by using the AR algorithm or pedometer 236 that the user of mobile device 200 is walking while staring at the phone, processor 220 may forward predict the angle of mobile device 200 at the next CDRX cycle period by using a linear predictor such as:

$$\text{predicted angle} = \alpha * \text{current angle} + (1-\alpha) * \text{currentGyro} * \Delta t \text{ where}$$

predicted angle=forward predicted angle of mobile device 200 at next CDRX cycle period;

α=constant based on inputs from pedometer 236;

current angle=current angle of mobile device 200;

currentGyro=current gyroscope 232 reading;

Δt=change in time. For example, in CDRX mode, this could be one CDRX cycle period.

The above "predicted angle" equation may be used to as a part of gyroscope rotation vector prediction in predicting the orientation of mobile device 200. The above equation is just an exemplary equation and processor 220 may use many other equations and algorithms to forward predict the positional information of mobile device 200. In an aspect, processor 220 may utilize a neural network such as deep learning neural network to forward predict the positional information of mobile device 200. In an aspect, processor 220 may use the forward prediction or the forward estimate of the positional information (i.e., orientation, motion and/or position) of mobile device 200 to perform antenna beam management at the start of next CDRX cycle period so that mobile device 200 is ready to receive communication from a base station when mobile device 200 wakes up from sleep at the next CDRX period.

However, if the forward prediction or estimate exceeds a certain threshold, processor 220 may perform an asynchronous collection of data from the sensors in sensor system 230. As shown in FIG. 5, at time 510, which is between T=2 and T=3, processor 220 may collect the data detected by sensors in the sensor system 230 even though the time at 510 does not coincide with the beginning of a CDRX cycle period because the forward prediction or estimate of the positional information of mobile device 200 determined at time T=2 exceeded a certain threshold. For example, such an event may happen if a user of mobile device 200 picks up mobile device 200 to use the mobile device 200 from a stationary state such as lying on a desk. When mobile device 200 moves quickly, the forward prediction of the positional information may exceed a certain threshold. When such an event occurs, processor 220 may need to quickly perform an antenna beam management before the next CDRX cycle period. Thus, processor 220 may perform an asynchronous management of the antenna beams when the forward prediction or estimate exceeds a certain threshold. In other words, in an aspect, processor 220 may perform an asynchronous management of the antenna beams when the forward prediction or estimate exceeds a certain threshold by first performing an asynchronous collection of data from the sensors in sensor system 230 and using the asynchronously collected data to perform the antenna beam management.

In an aspect, if mobile device 200 is operating under the non-CDRX mode, processor 220 may use a wake-up period for antenna management that does not coincide with any CDRX mode cycle period. Under the non-CDRX mode, processor 220 may change the wake-up period for antenna beam management flexibly based on the positional and activity information of mobile device 200.

For example, if processor 220 determines that the user of mobile device 200 is walking slowly with mobile device 200, processor 220 may need to perform an antenna beam management every 5 ms (i.e., the wake-up period is 5 ms) whereas if mobile device 200 is stationary on a desk, processor 220 may need to perform an antenna beam management every 10 ms (i.e., the wake-up period is longer at 10 ms since mobile device 200 is stationary). If the user of mobile device 200 is walking at a rapid pace, processor 220 may need to perform an antenna beam management every 2 ms since mobile device 200 is moving at a faster rate and the orientation of mobile device 200 may consequently change at a faster rate. Thus, when mobile device 200 is operating under the non-CDRX mode, processor 220 may vary the wake-up period for the antenna beam management based on the positional and activity information such as orientation, motion, position, and/or activity of mobile device 200 as determined by processor 220. As discussed above, processor 220 may determine the positional and activity information of mobile device 200 based on the data detected by the sensors in sensor system 230 at every wake-up period. Basically, even under the non-CDRX mode, processor 220 may follow the procedure outlined above for the CDRX mode, but under the non-CDRX mode, processor 220 may vary the wake-up period for antenna beam management flexibly based on the positional and activity information of mobile device 200.

In an aspect, processor 220 may record the wake-up periods for various positional and activity information of mobile device 200 in memory 240 in a table or a code book format. Processor 220 may refer to such table or codebook in future to assist in determining a new wake-up period.

In an aspect, even when mobile device 200 is operating under the CDRX mode, processor 220 may try to vary the length of the CDRX cycle period based on the positional and activity information of mobile device 200 by working with a base station serving the mobile device 200. In other words, processor 220 may try to change Δt 520 shown in FIG. 5. If processor 220 determines that current CDRX cycle period is too long or too short to accommodate the activity of mobile device 200, processor 220 may communicate this information to the base station to adjust the CDRX cycle period. For example, if the current CDRX cycle period is 5 ms and the user of mobile device 200 is walking rapidly, processor 220 may determine that a wake-up period of 3 ms for antenna beam management would be better to accommodate the rapidly shifting or moving mobile device 200. Processor 220 may communicate this information (i.e., the more appropriate CDRX cycle period) to the base station so that the length of the period for the CDRX mode can be adjusted to suit the motion or activity of mobile device 200. The base station may change the CDRX mode cycle period as recommended by processor 220.

In an aspect, certain factors may affect the measurement accuracy of the sensors in sensor system 230 and cause synchronization error between the sensors and processor 220. Such factors as sensor bias, sensitivity of the sensors, antenna mismatches and system level synchronization errors may cause errors in the measurement accuracy of the sensors. Such errors may be mitigated by using other input sources such as a camera that may be included in mobile device 200. For example, if the camera on mobile device 200 detects a base station, processor 220 may estimate a camera based pose that may provide a complimentary input that may help to tune the sensors and synchronization between the sensor system 230 and processor 220. Thus, the camera based pose may mitigate sensor errors.

In another example, when mobile device 200 is located in an outdoor environment free of magnetic effects, magnetometer 236 may provide relatively error free reading, so the processor 220 may use the magnetometer 236 reading to reset any calculated rotation or orientation vector to avoid error accumulation caused by gyro effects.

In an aspect, the error caused by drift of the sensors in sensor system 230 may be reduced by calculating a relative pose estimate (i.e., the combination of orientation and translation estimate) as measured by the sensors after every update to processor 220 to avoid long term error accumulation. Processor 220 may utilize these relative pose estimates to aid in the antenna beam management.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 210 to 240 may be implemented by processor and memory component(s) of the mobile device 200 (e.g., by execution of appropriate code and/or by appropriate configuration of processor components). However, as will be appreciated, such operations, acts, and/or functions may actually be performed by specific components or combinations of components of mobile device 200, such as antenna array 210, transceiver 222, processor 220, sensor system 230 and memory 240.

Figure 3A:
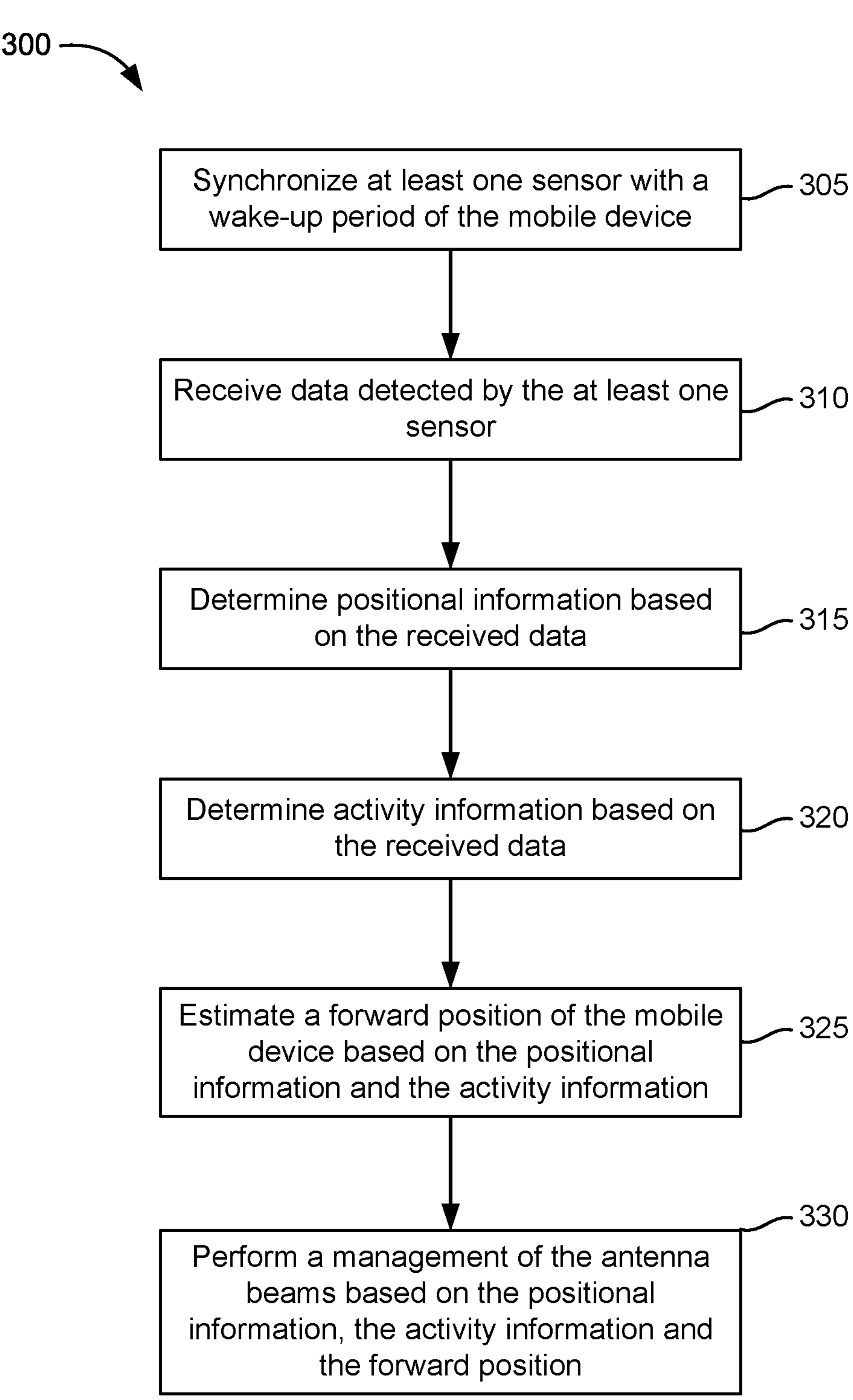
FIGS. 3A-3B illustrate flowcharts corresponding to one or more methods of managing antenna beams, according to various aspects of the disclosure.
Figure 3B:
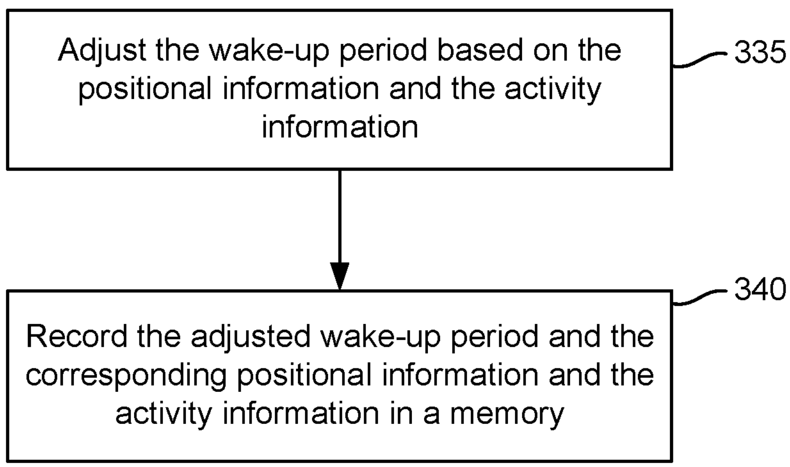

It will be appreciated that aspects include various methods for performing the processes, functions and/or algorithms disclosed herein. For example, FIGS. 3A-3B show a method 300 for determining positional and activity information of a mobile device in synchronization with the wake-up period of the mobile device to perform antenna beam management and adjusting the wake-up period based on the positional and activity information of the mobile device. The method may be performed by a device such as mobile device 200, processor 220, UEs 104, 190 or other UEs shown in FIG. 1. In one configuration, the method 300 described in FIG. 3 may be performed by mobile device 400 described below with reference to FIG. 4.

At block 305, the method synchronizes the sensors with a wake-up period of the mobile device. Processor 220 may synchronize the sensors in sensor system 230 with a wake-up period of mobile device 200. In the CDRX mode, processor 220 may synchronize the sensors with the CDRX mode cycle period.

At block 310, the method receives the data detected and measured by the sensors. Processor 220 may receive the data detected and measured by the sensors in sensor system 230 synchronously with the wake-up period.

At block 315, the method determines the positional information of the mobile device based on the data detected by the sensors. Processor 220 may determine the positional information including the orientation, translation and motion of mobile device 200 based on the data received from the sensors in sensor system 230.

At block 320, the method determines the activity information of the mobile device based on the data detected by the sensors. Processor 220 may determine the activity information of mobile device 200 based on the data detected by the sensors in senor system 230. The activity information may include activities that the user of mobile device 200 have engaged in while possessing mobile device 200. For example, processor 220 may determine whether the user is walking, running or stationary while using or possessing mobile device 200.

At block 325, the method estimates the forward position or future position of the mobile device based on the positional information. Processor 220 may estimate the forward position of mobile device 200 based on the positional information. In the CDRX mode, processor 220 may estimate or predict the forward position of mobile device 200 at the next CDRX mode cycle period.

At block 330, the method performs antenna beam management based on the positional information, activity information and the estimated forward position. Processor 220 may perform antenna beam management based on the positional information, activity information and the estimated forward position of mobile device 200. Processor 220 may perform antenna beam management such as transmit and receive beamforming using the antennas in antenna array 210.

At block 335, the method adjusts the wake-up period of the mobile device based on the positional and activity information. Processor 220 may adjust the wake-up period of mobile device 200 based on the positional and activity information of mobile device 200. In the CDRX mode, processor 220 may communicate the possible new wake-up period to the base station so that the base station can change the length of the CDRX mode cycle period. In non-CDRX mode, processor 220 may adjust and change the wake-up period on its own without communicating with the base station.

At block 340, the method records the adjusted wake-up period and the corresponding positional and activity information in the memory of the mobile device. Processor 220 may record the adjusted wake-up period and the corresponding positional and activity information in memory 240 of mobile device 200 for future references. The recorded wake-up period and the corresponding positional and activity information may be recorded in a table format or in a code book format.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of managing antenna beams in a mobile device, the method comprising: synchronizing at least one sensor with a wake-up period of the mobile device; receiving data detected by the at least one sensor; determining positional information based on the received data; determining activity information based on the received data; estimating a forward position of the mobile device based on the positional information and the activity information; and performing a management of the antenna beams based on the positional information, the activity information and the forward position.

Clause 2. The method of clause 1, further comprising: adjusting the wake-up period based on the positional information and the activity information.

Clause 3. The method of clause 2, further comprising: recording the adjusted wake-up period and the corresponding positional information and the activity information in a memory.

Clause 4. The method of any of clauses 1 to 3, further comprising: performing an asynchronous management of the antenna beams when the estimated forward position exceeds a threshold.

Clause 5. The method of any of clauses 1 to 4, wherein the wake-up period aligns with a Connected Mode Discontinuous Reception (CDRX) mode cycle period.

Clause 6. The method of any of clauses 1 to 5, wherein the at least one sensor includes: a gyroscope, an accelerometer, a magnetometer or a pedometer.

Clause 7. The method of any of clauses 1 to 6, wherein the positional information includes at least one of: an orientation of the mobile device, a translation of the mobile device or a motion of the mobile device.

Clause 8. The method of any of clauses 1 to 7, wherein the activity information includes information regarding an activity of a user of the mobile device while using or possessing the mobile device.

Clause 9. The method of any of clauses 1 to 8, wherein the estimated forward position predicts the forward position at a next wake-up period.

Clause 10. The method of any of clauses 2 to 9, further comprising: communicating the adjusted wake-up period to a base station during a Connected Mode Discontinuous Reception (CDRX) mode.

Clause 11. An apparatus comprising a memory, a communication interface, and at least one processor communicatively coupled to the memory and the communication interface, the memory, the communication interface, and the at least one processor configured to perform a method according to any of clauses 1 to 10.

Clause 12. An apparatus comprising means for performing a method according to any of clauses 1 to 10.

Clause 13. A non-transitory computer-readable medium storing computer-executable instructions, the computer-executable comprising at least one instruction for causing a computer or processor to perform a method according to any of clauses 1 to 10.

Figure 4:
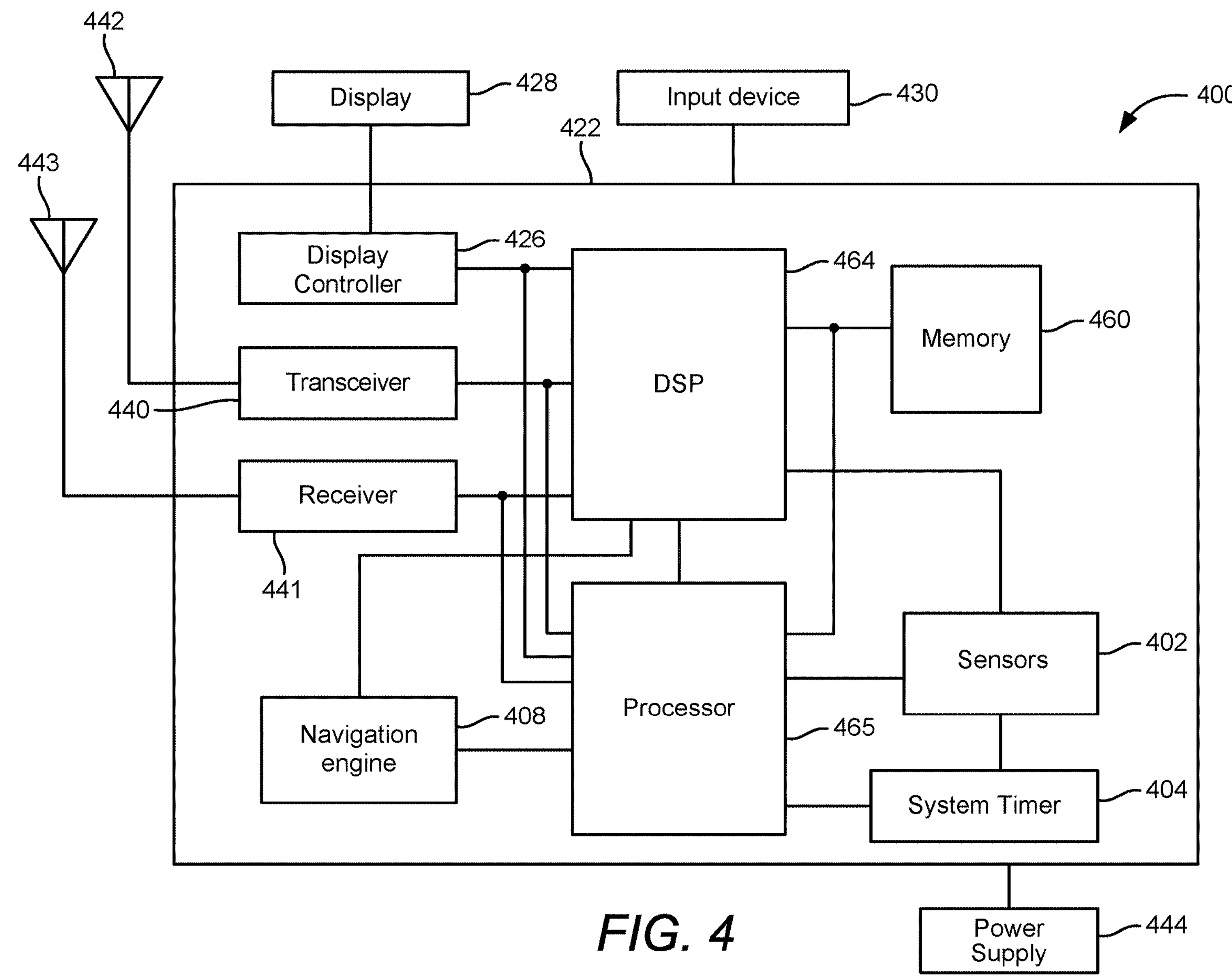
FIG. 4 illustrates an exemplary implementation of a wireless communication device configured for managing antenna beams according to various aspects of the disclosure.

With reference now to FIG. 4, another exemplary device 400 implemented as a wireless communication system is illustrated. Device 400 is similar to mobile device 200 and UEs 104 and 190 in many exemplary aspects, and the depiction and description of device 400 includes various additional exemplary components not shown with relation to mobile device 200 and UEs 104 and 190 shown in FIGS. 1 and 2. As shown in FIG. 4, device 400 includes digital signal processor (DSP) 464 and a general purpose processor, depicted as processor 465. The above-described functions and methods related to determining positional and activity information of a mobile device in synchronization with the wake-up period of the mobile device to perform antenna beam management and adjusting the wake-up period based on the positional and activity information of the mobile device can be performed in DSP 464 or processor 465 or any combination of the processing elements thereof. Accordingly, in some aspects, processor 465 may be configured to perform operations described with regard to processor 220, but it will be understood that some of the operations related to managing antenna beams by determining positional and activity information of a mobile device in synchronization with the wake-up period of the mobile device can be performed in DSP 464, and moreover, these operations can be implemented in any suitable combination of hardware and software. In some aspects, processor 465 may be configured to perform antenna beam management in both CDRX and non-CDRX modes. Both DSP 464 and processor 465 may be coupled to memory 460. Navigation engine 408 can be coupled to DSP 464 and processor 465 and used to provide location data to DSP 464 and processor 465. Sensors 402 may include sensors such as gyroscope 232, accelerometer 234, magnetometer 236 and pedometer 236 and can be coupled to DSP 464 and processor 465 and provide data to DSP 464 and processor 465. Display controller 426 can be coupled to DSP 464, processor 465, and to display 428. Other components, such as transceiver 440 (which may be part of a modem) and receiver 441 are also illustrated. Transceiver 440 can be coupled to antenna array 442, which may be configured to receive wireless signals from a calibrated terrestrial source such as WWAN, CDMA, etc. Receiver 441 can be coupled to a satellite or GNSS antenna 443, which may be configured to receive wireless signals from satellites or GNSS signals. System timer 404 is also illustrated and may provide timing signals to DSP 464 and processor 465 to determine time of the day or other time related data. In a particular aspect, DSP 464, processor 465, display controller 426, memory 460, navigation engine 408, transceiver 440, receiver 441, sensors 402, and system timer 404 are included in a system-in-package or system-on-chip device 422.

In a particular aspect, input device 430 and power supply 444 are coupled to the system-on-chip device 422. Moreover, in a particular aspect, as illustrated in FIG. 4, display 428, input device 430, antenna array 442, GNSS antenna 443, and power supply 444 are external to the system-on-chip device 422. However, each of display 428, input device 430, antenna array 442, GNSS antenna 443, and power supply 444 can be coupled to a component of the system-on-chip device 422, such as an interface or a controller.

In one aspect, one or both of DSP 464 and processor 465, in conjunction with one or more remaining components illustrated in FIG. 4, can include logic/means to determine positional and activity information of a mobile device in synchronization with the wake-up period of the mobile device to perform antenna beam management and adjust the wake-up period based on the positional and activity information of the mobile device as discussed, for example, in Blocks 305-340 of FIGS. 3A and 3B. For example, DSP 464, processor 220 and/or processor 465 can include logic/means to implement functions related to synchronizing at least one sensor with a wake-up period of the mobile device; receiving data detected by the at least one sensor; determining positional information based on the received data; determining activity information based on the received data; estimating a forward position of the mobile device based on the positional information and the activity information; and performing a management of the antenna beams based on the positional information, the activity information and the forward position.

It should be noted that although FIG. 4 depicts a wireless communications device, DSP 464, processor 465, and memory 460 may also be integrated into a device, selected from the group consisting of a set-top box, a music player, a video player, an entertainment unit, a navigation device, a communications device, a personal digital assistant (PDA), a fixed location data unit, or a computer. Moreover, such a device may also be integrated in a semiconductor die.

Accordingly it will be appreciated from the foregoing that at least one aspect includes a mobile device having a memory and a processor configured to: synchronize the at least one sensor with a wake-up period of the mobile device;

receive the data detected by the at least one sensor; determine positional information based on the received data; determine activity information based on the received data; estimate a forward position of the mobile device based on the positional information and the activity information; and perform a management of antenna beams of the mobile device based on the positional information, the activity information and the forward position.

The various aspects disclosed advantageously allows the mobile device to determine positional and activity information of a mobile device in synchronization with the wake-up period of the mobile device to perform antenna beam management and adjust the wake-up period based on the positional and activity information of the mobile device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of managing antenna beams in a mobile device, the method comprising:

synchronizing an operation of at least one sensor in the mobile device with a Connected Mode Discontinuous Reception (CDRX) mode cycle period of the mobile device;

receiving data detected by the at least one sensor;

determining positional information of the mobile device based on the received data;

determining activity information of the mobile device based on the received data;

determining an appropriate length of the CDRX mode cycle period based on the positional information and the activity information;

transmitting the appropriate length of the CDRX mode cycle period to a base station; and receiving a new length for the CDRX mode cycle period from the base station, wherein the new length is based on the appropriate length of the CDRX mode cycle period.

2. The method of claim 1, further comprising:
changing the length of the CDRX mode cycle period to the new length.

3. The method of claim 2, further comprising:
estimating a forward position of the mobile device based on the positional information and the activity information.

4. The method of claim 3, further comprising:
performing a management of the antenna beams based on the positional information, the activity information and the forward position.

5. The method of claim 3, wherein the estimated forward position predicts the forward position at a next CDRX mode cycle period.

6. The method of claim 1, wherein the at least one sensor includes: a gyroscope, an accelerometer, a magnetometer or a pedometer.

7. The method of claim 1, wherein the positional information includes at least one of: an orientation of the mobile device, a translation of the mobile device or a motion of the mobile device.

8. The method of claim 1, wherein the activity information includes information regarding an activity of a user of the mobile device while using the mobile device.

9. A mobile device comprising:
a memory;
at least one sensor for detecting data; and
one or more processors communicatively coupled to the memory and the at least one sensor, the one or more processors, either alone or in combination, configured to:
synchronize an operation of the at least one sensor with a Connected Mode Discontinuous Reception (CDRX) mode cycle period of the mobile device;
receive the data detected by the at least one sensor;
determine positional information of the mobile device based on the received data;
determine activity information of the mobile device based on the received data;
determine an appropriate length of the CDRX mode cycle period based on the positional information and the activity information;
transmit the appropriate length of the CDRX mode cycle period to a base station; and
receive a new length for the CDRX mode cycle period from the base station, wherein the new length is based on the appropriate length of the CDRX mode cycle period.

10. The mobile device of claim 9, wherein the one or more processors are configured to change the length of the CDRX mode cycle period to the new length.

11. The mobile device of claim 10, wherein the one or more processors are configured to estimate a forward position of the mobile device based on the positional information and the activity information.

12. The mobile device of claim 11, wherein the one or more processors are configured to perform a management of antenna beams of the mobile device based on the positional information, the activity information and the forward position.

13. The mobile device of claim 11, wherein the estimated forward position predicts the forward position at a next CDRX mode cycle period.

14. The mobile device of claim 9, wherein the at least one sensor includes: a gyroscope, an accelerometer, a magnetometer or a pedometer.

15. The mobile device of claim 9, wherein the positional information includes at least one of: an orientation of the mobile device, a translation of the mobile device or a motion of the mobile device.

16. The mobile device of claim 9, wherein the activity information includes information regarding an activity of a user of the mobile device while using the mobile device.

17. A mobile device comprising:
means for synchronizing an operation of at least one sensor in the mobile device with a Connected Mode Discontinuous Reception (CDRX) mode cycle period of the mobile device;
means for receiving data detected by the at least one sensor;
means for determining positional information of the mobile device based on the received data;
means for determining activity information of the mobile device based on the received data;
means for determining an appropriate length of the CDRX mode cycle period based on the positional information and the activity information;
means for transmitting the appropriate length of the CDRX mode cycle period to a base station; and
means for receiving a new length for the CDRX mode cycle period from the base station, wherein the new length is based on the appropriate length of the CDRX mode cycle period.

18. The mobile device of claim 17, further comprising:
means for changing the length of the CDRX mode cycle period to the new length.

19. The mobile device of claim 18, further comprising:
means for estimating a forward position of the mobile device based on the positional information and the activity information.

20. The mobile device of claim 19, further comprising:
means for performing a management of antenna beams of the mobile device based on the positional information, the activity information and the forward position.

21. A non-transitory computer-readable storage medium comprising code, which, when executed by a processor, causes the processor to manage antenna beams in a mobile device, the non-transitory computer-readable storage medium comprising:
code for synchronizing an operation of at least one sensor of the mobile device with a Connected Mode Discontinuous Reception (CDRX) mode cycle period of the mobile device;
code for receiving data detected by the at least one sensor;
code for determining positional information of the mobile device based on the received data;
code for determining activity information of the mobile device based on the received data;
code for determining an appropriate length of the CDRX mode cycle period based on the positional information and the activity information;
code for transmitting the appropriate length of the CDRX mode cycle period to a base station; and
code for receiving a new length for the CDRX mode cycle period from the base station, wherein the new length is based on the appropriate length of the CDRX mode cycle period.

22. The non-transitory computer-readable storage medium of claim 21, further comprising:
code for changing the length of the CDRX mode cycle period to the new length.

23. The non-transitory computer-readable storage medium of claim 22, further comprising:

code for estimating a forward position of the mobile device based on the positional information and the activity information.

24. The non-transitory computer-readable storage medium of claim 23, further comprising:

code for performing a management of the antenna beams of the mobile device based on the positional information, the activity information and the forward position.

* * * * *